Dec. 9, 1952 — M. RICHARDSON — 2,620,790

JUICE OVERFLOW CATCHMENT TROUGH

Filed Sept. 4, 1948

Inventor:
Margaret Richardson
By: Auterstonhaugh & Co
her Atty's

Patented Dec. 9, 1952

2,620,790

UNITED STATES PATENT OFFICE 2,620,790

JUICE OVERFLOW CATCHMENT TROUGH

Margaret Richardson, Winnipeg, Manitoba, Canada

Application September 4, 1948, Serial No. 47,797

1 Claim. (Cl. 126—385)

My invention relates to new and useful improvements in juice overflow catchment troughs, an object of my invention being to provide a device of the character herewithin described whereby the juices exuding from a pie during the baking thereof may be retained and returned to the pie during serving.

A further object of my invention is to provide a device of the character herewithin described whereby the juice exuding from a pie during baking may be prevented from spilling into the oven thus assisting materially in keeping the oven in a clean condition.

Another object of my invention is to provide a device of the character herewithin described which incorporates means whereby the pie and pie-plate may be lifted from the oven by the catchment trough when baking is complete.

A still further object of my invention is to provide a device of the character herewithin described which may be detached from the pie-plate after baking, without fracturing the crust.

Another object of my invention is to provide a device of the character herewithin described which incorporates means to prevent the spoilage of the crust occurring due to the exuding of juices during baking.

Another object of my invention is to provide a device of the character herewithin described which is economical in manufacture, simple in construction, and which is otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

In the art of pie making considerable difficulty has been experienced in the past in maintaining the fluid contents of the fruit filling. A large majority of the fruit used in pie fillings rely upon the juices for their flavor, and, due to the expansion caused by heat, the majority of this juice exudes from the pie to be deposited into the oven. This exuded juice, apart from lessening the flavor of the pie, forms a solid residue in the bottom of the oven which is extremely difficult to remove.

Juice catchment troughs at present on the market, while eliminating the soiling of the oven, do not prevent the exuding juices from making the pie-crust moist and soggy. Consequently I have designed the device hereinafter to be described which as well as catching and retaining the juices also prevents them from entering between the lower pie shell and the pie-plate, therefore ensuring a firm pie-crust.

Figure 1:
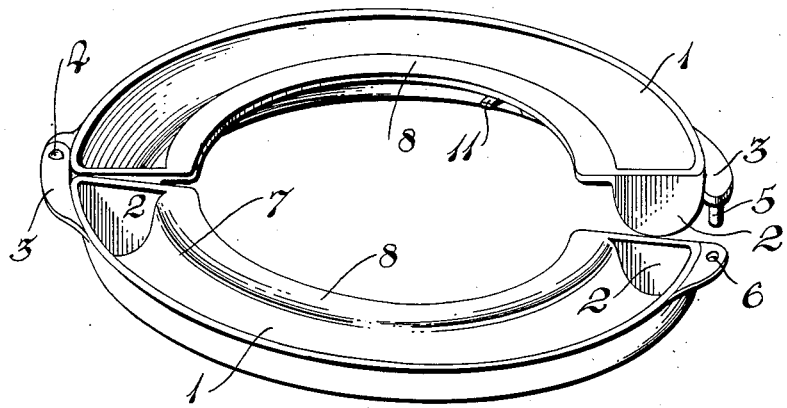
Figure 1 is a perspective view of my catchment trough shown in the partly open position.
Figure 2:
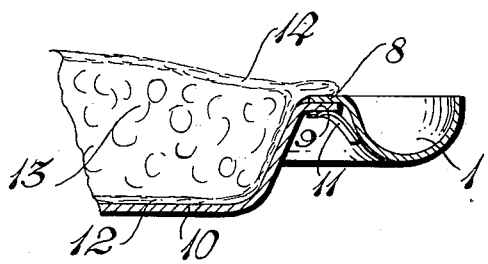
Figure 2 is a fragmentary cross-sectional representation of a pie and pie-plate with my device in situ.

Proceeding therefore to describe my invention in detail, it will be seen upon reference to the accompanying drawings that I have provided a pair of semi-circular juice troughs 1 manufactured from metal, plastic or the like, each trough having end walls 2 formed therein thus constituting a sealed trough for the retention of the exuded juices as will hereinafter be explained. The ends of each trough are provided with the externally situated outstanding flanges 3 by which they may be adjacently connected together to form an annular juice retainer. In this embodiment the left-hand pair of flanges (with relation to Figure 1 of the accompanying drawings) are hingedly connected together by means of the loose rivets 4, while the right-hand flanges constitute the detachable connecting means comprising the downwardly projecting pin 5 which is registerable with the corresponding aperture 6 within the adjacent flange. In this context it is to be noted that one flange of each pair projects beyond the adjacent end wall and that the other flange is flush with its end wall thus permitting the adjacent end walls of each trough to lie flush one with the other when the troughs are in the assembled or closed position.

The inner wall 7 of each juice trough is provided with an internal horizontally projecting plate-lapping flange 8 at the upper edge thereof which is designed to overlap the rim 9 of the associated pie-plate 10 for the purpose hereinafter to be described.

In order to enable the associated pie-plate 10 to be lifted by the catchment trough 1, I have incorporated a plurality of supporting clips 11, attached to the lowermost portion of the inner wall 7 of the trough, which extend upwardly and inwardly to underlap the rim 9 of the pie-plate. It is desired that these clips be manufactured from material substantially thicker than the juice troughs in order to ensure rigidity during the lifting of the plate which may have considerable weight when filled with fruit and the like.

It will be appreciated that these clips which are situated at spaced intervals around the internal perimeter of the trough may be replaced if desired by a continuous flange complementing the aforementioned internal flange 8.

Having therefore described my invention in detail, its method of application will now be presented. The juice troughs 1 are placed around the rim 9 of the associated pie-plate 10 ensuring that the flanges 8 are above the rim and the clips 7 are below, whereupon the pin 5 is engaged within the aperture 6 thus locking the annular juice container to the plate. In this connection it has been found desirable to ensure that the flanges 8 are manufactured from resilient material in order that they may be under slight tension when in position thus assisting in the rigidity of the assembly. The lower pie-crust 12 is then placed within the plate and lapped over the internal flange 8 to a position flush with the perimeter of the rim 9. The filling 13 is now introduced whereupon the upper crust 14 is placed in position and sealed in the conventional manner. During the baking process juices exuded from the filling will pass between the upper and lower crust and be deposited within the trough 1, and it should be noted that the overlapping relationship between the flanges 8 and the lower crust 12 will prevent any undesirable deposition of juice occurring between the plate and the pie-crust. When the baking process is completed, the pie may be removed from the oven by lifting with the trough portions, fracturing of the pie-crust being prevented by the aforementioned underlapping clips 11. If desired the pin 5 may be removed from the aperture 6 whereupon the two trough portions may be removed tangentially from the rim 9 pivoting around the loose rivet 4, the juice being retained in the two trough portions by means of the end walls 2 thereof.

Figure 3:
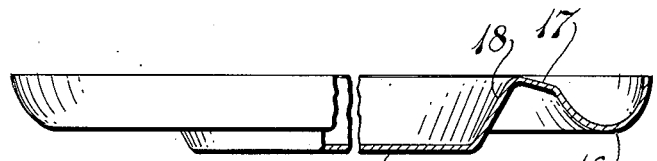
Figure 3 is a cross-sectional representation of an alternative embodiment of my device incorporated with a pie plate.

Figure 3 of the accompanying drawings shows an alternative embodiment of my device formed in one piece with a pie-plate 15. The trough 16 is formed as a continuation of the pie-plate rim 17 and extends circumferentially around the plate. It is desired that the rim 17 is provided with a relatively small inclination downwardly and outwardly from the uppermost edge 18 of the plate in order to facilitate the draining of the exuded juices into the catchment trough 16.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A juice-overflow catchment for pie plates and the like comprising in combination a pair of semi-circular juice troughs together constituting an annular juice retainer adapted to surround said pie-plate, end walls on each of said semi-circular juice troughs, an interior horizontally projecting plate-overlapping flange on each of said semi-circular juice troughs, a plurality of clips projecting internally of each trough adapted to underlap the rim of said pie plate whereby the same may be lifted bodily via said catchment, said pair of troughs being hingedly connected at one end and having fastening means at the other end for maintaining same in position around said pie-plate said hinge connection including an externally situated, outstanding flange on adjacent ends of said trough and a pivot pin connecting said flanges together, said fastening means including an externally situated, outstanding flange on the opposite ends of the said trough, and a downwardly projecting pin on one of said last mentioned flanges, said pin being selectively engageable with an aperture in the other of said last mentioned flanges.

MARGARET RICHARDSON.

REFERENCES CITED

The following references are of record in the file of this patent:

UNITED STATES PATENTS

| Number | Name | Date |
|---|---|---|
| 274,219 | Parsons | Mar. 20, 1883 |
| 497,162 | Backman | May 9, 1893 |
| 793,653 | Gorman | July 4, 1905 |
| 835,715 | Sesseli | Nov. 13, 1906 |
| 848,698 | Smith | Apr. 2, 1907 |
| 1,832,117 | Henning | Nov. 17, 1931 |
| 2,026,829 | Ellinger | Jan. 7, 1936 |
| 2,079,281 | Duarte | May 4, 1937 |
| 2,211,261 | Enos | Aug. 13, 1940 |

FOREIGN PATENTS

| Number | Country | Date |
|---|---|---|
| 206,141 | Germany | Jan. 18, 1909 |
| 239,921 | Switzerland | Mar. 16, 1946 |